United States Patent
El-Sana et al.

(10) Patent No.: US 8,615,131 B2
(45) Date of Patent: Dec. 24, 2013

(54) ONLINE ARABIC HANDWRITING RECOGNITION

(75) Inventors: Jihad El-Sana, Be'er Sheva (IL); Fadi Biadsy, Baqa El Garbya (IL)

(73) Assignee: BGN Technologies Ltd, Be'er Sheva (IL)

( * ) Notice: Subject to any disclaimer, the term of this patent is extended or adjusted under 35 U.S.C. 154(b) by 653 days.

(21) Appl. No.: 12/374,773

(22) PCT Filed: Jul. 26, 2007

(86) PCT No.: PCT/IL2007/000940
§ 371 (c)(1),
(2), (4) Date: Jan. 28, 2010

(87) PCT Pub. No.: WO2008/012824
PCT Pub. Date: Jan. 31, 2008

(65) Prior Publication Data
US 2010/0128985 A1     May 27, 2010

Related U.S. Application Data

(60) Provisional application No. 60/833,900, filed on Jul. 27, 2006.

(51) Int. Cl.
*G06K 9/00*     (2006.01)
(52) U.S. Cl.
USPC .......................... 382/189; 382/186; 382/159

(58) Field of Classification Search
USPC ............... 382/187, 189, 186, 159; 704/256.2, 704/242, E15.005
See application file for complete search history.

(56) References Cited

U.S. PATENT DOCUMENTS

| | | | |
|---|---|---|---|
| 5,933,525 | A  | 8/1999 | Makhoul et al. |
| 6,370,269 | B1 | 4/2002 | Al-Karmi et al. |
| 6,920,247 | B1 | 7/2005 | Mayzlin et al. |
| 2004/0141646 | A1 | 7/2004 | Mahmoud Fahmy et al. |

OTHER PUBLICATIONS

Beigi et al: "On-line unconstrained handwriting recognition based on probabilistic techniques", In Proceedings of the 4th Iranian Conference on Electrical Engineering (ICEE'95), Tehran, Iran, 1995.*

(Continued)

*Primary Examiner* — Ruiping Li
(74) *Attorney, Agent, or Firm* — Pearl Cohen Zedek Latzer Baratz LLP; Mark S. Cohen (57) ABSTRACT

Method for online character recognition of Arabic text, the method including receiving handwritten Arabic text from a user in the form of handwriting strokes, sampling the handwriting strokes to acquire a sequence of two dimensional point representations thereof, with associated temporal data, geometrically pre processing and extracting features on the point representations, detecting delayed strokes and word parts in the pre processed point representations, projecting the delayed strokes onto the body of the word parts, constructing feature vector representations for each word part, thereby generating an observation sequence, and determining the word with maximum probability given the observation sequence, resulting in a list of word probabilities.

20 Claims, 8 Drawing Sheets

(56) References Cited

OTHER PUBLICATIONS

Lorigo et al: "Segmentation and Pre-Recognition of Arabic Handwriting", Proceedings of the 2005 Eight International Conference on Document Analysis and Recognition (ICDAR'05), IEEE, Sep. 2005.*

International Search Report for International Application No. PCT/IL2007/000940 dated Dec. 27, 2007 (Form PCT/ISA/210).

Obaid. "A New Pattern Matching Approach to the Recognition of Printed Arabic." 1998. pp. 106-111 http://acl.ldc.upenn.edu/W/W98/W98-1015.pdf.

Beigi. "An Overview of Handwriting Recognition." *Proceedings of the 1st Annual Conf. on Tech. Adv. in Developing Countries.* 1993. pp. 30-46.

"Multi-Segment System for Recognizing Cursive Writing." *IBM Technical Disclosure Bulletin.* vol. 27. No. 11. 1985. pp. 6735-6739.

Tappert. "Delayed Stroke Processor for Handwriting Recognition." *IBM Technical Disclosure Bulletin.* vol. 26. No. 12. 1984. pp. 6616-6619.

\* cited by examiner

ONLINE ARABIC HANDWRITING RECOGNITION

This application is a National Stage Application of PCT/IL2007/000940, filed 26 Jul. 2007, which claims benefit of U.S. Ser. No. 60/833,900, filed 27 Jul. 2006 and which applications are incorporated herein by reference. To the extent appropriate, a claim of priority is made to each of the above disclosed applications.

FIELD OF THE DISCLOSED TECHNIQUE

The disclosed technique relates to optical character recognition, in general, and to a method for recognition of online handwritten Arabic text in real-time, in particular.

BACKGROUND OF THE DISCLOSED TECHNIQUE

Optical character recognition (OCR) generally involves translating images of text into an encoding representing the actual text characters. OCR techniques for text based on a Latin script alphabet are widely available and provide very high success rates. Handwritten text generally presents different challenges for recognition than typewritten text.

Character recognition of handwritten text may be divided into offline recognition and online recognition. An offline recognition system first scans a handwritten text document, and then processes the scanned text. Offline recognition does not require immediate interaction with the user, and accordingly, is not performed in real-time. In contrast, online recognition involves a user writing text on a digital device (e.g., a graphics tablet) using a compatible writing instrument (e.g., a digital pen). The online recognition system samples the text as a sequence of two-dimensional points in real-time. Therefore, online recognition requires tracking temporal data as well as spatial data.

Recognition of handwritten non-cursive Latin script generally involves some form of segmentation. The segmentation process divides the entire text into separate text lines, divides each text line into individual words, and separates each word into individual characters. The recognition of each character then proceeds accordingly. However, with cursive text, segmentation is inherently difficult. This difficulty is further compounded with particular languages, such as those using Arabic script.

The Arabic script contains 28 basic letters, along with additional special letters, and several diacritics. Arabic text is written from right to left, in a cursive style, and is unicase (i.e., there is no uppercase and lowercase). Many features inherent in Arabic script complicate character recognition. One such feature is the interconnectedness of the letters. As the cursive nature of the Arabic script indicates, most letters are written attached to one another. Therefore, it is difficult to determine where a certain letter begins and where that letter ends, which in turn makes segmentation problematic. Furthermore, certain letters do not connect to the following letter in the word. As a result, a single Arabic word may be composed of several "word-parts", each such word-part being a group of interconnected letters.

Another feature of Arabic script is context dependence. The shape of certain letters depends on the position of the letter within the word. For example, the letter ع (ayn) appears as: ع (isolated); عـ (initial); ـعـ (medial); and ـع (final). The Arabic alphabet also contains a number of ligatures, such as لا (lam alif—isolated).

A further feature of Arabic script is the presence of dots and strokes. Most Arabic letters contain dots in addition to the letter body. For example, the letter ش (sheen) is made up of the same letter body as س (seen) with three dots above. Several Arabic letters also contain strokes that attach to the letter body, such as with the letters: ك (kaf), ط (tah), and لا (lam alif). In general, these dots and strokes are known as "delayed strokes", since they are usually drawn last in a handwritten word. Many letters are differentiated solely in the number and position of the dots or strokes relative to the letter body. By eliminating, adding, or moving a dot or stroke, a different letter may be generated, which may in turn result in a completely different word. For example, the word: عزام (EzAm) [lion] differs from the word: غرام (grAm) [love] only in the position of the sole dot in the word. Another example is the word: عرب (Erb) [Arab], which differs from the word: غرب (grb) [west], only in the absence of the dot above the first letter. The existence of delayed strokes associated with different letters clearly causes difficulties for a segmentation approach to recognition.

Furthermore, different variants of delayed strokes may further complicate recognition. For example, the two dots written above or below a letter: (••) is sometimes written as a dash: (-). Similarly, the three dots written above a letter: (∴) is sometimes written as a circumflex: (ˆ). Arabic script also contains diacritics, which are optional marks placed above or below letters, mainly for representing short vowels or consonant doubling.

In addition, a top-down writing style is very common in Arabic script, where letters in a word are written above consequent letters. As a result, it is difficult to predefine the position of letters relative to the base line of the word, further complicating the task of recognition.

Most of the existing techniques for Arabic character recognition are directed to offline recognition. Several techniques for online recognition of Arabic script focus on isolated Arabic letters only, rather than comprehensive text. The majority of such techniques operate based on segmentation, and attempt to distinguish between individual letters in each word. Other techniques for online Arabic handwriting recognition known in the art utilize decision-tree modeling, or neural networks.

U.S. Pat. No. 5,933,525 to Makhoul et al entitled "Language-independent and segmentation-free optical character recognition system and method", is directed to an OCR system that is independent of the text language, and does not involve word or character segmentation. The OCR method involves a training component and a recognition component. During training, the system receives scanned text as input, along with a sequence of characters that correspond to the different lines in the input. After preprocessing and feature extraction, the system estimates context-dependent character models, using a lexicon and grammar (also built during training using language modeling), and a set of orthographic rules. The orthographic rules specify certain aspects of the writing structure of the language (e.g., direction of text, ligatures, diacritics, syllable structure, and the like). The OCR system generates a Hidden Markov Model (HMM) for each character in the text, with the HMM parameters estimated from the training data. The training enables recognition for the particular language in which the system was trained, and for which the lexicon and grammar was established. During recognition, the system preprocesses the text page (i.e., deskewing the page and locating the text lines), and divides each line into a sequence of overlapping frames. Each frame is a narrow strip (i.e., a vertical strip for horizontally read text) arranged sequentially in the direction of the scan. Each frame is further divided into a plurality of cells, aligned along an axis perpendicular to the direction of the scan (i.e., vertically aligned for horizontally read text). Each cell may employ a matrix of detectors for detecting whether the portion of the image is light (i.e., not part of the scanned text) or dark (i.e., part of the scanned text). The system extracts features of the data for each frame. The features preferably include the percentage of black pixels within each of the cells (i.e., intensity as a function of vertical position). The features further preferably include the vertical and horizontal derivatives of intensity (i.e., a measure of the boundaries between the light and dark portions of the text), and the local slope and correlation across a window of a plurality of cells (i.e., the angle of a line). The recognition stage proceeds to find the sequence of characters with maximum probability, given the sequence of feature vectors that represent the input text. Given the analysis of a line of text, the OCR system searches for the most likely sequence of characters, given the sequence of input features, the lexicon, and the language model. The OCR system uses the Viterbi algorithm, or a multi-pass search algorithm, to calculate the most likely sequence of characters.

U.S. Pat. No. 6,370,269 to Al-Karmi et al entitled "Optical character recognition of handwritten or cursive text in multiple languages", is directed to a method and apparatus for recognition of cursive text in one or more languages from a scanned image. The method involves retrieving a first set of language-specific rules, which contains at least one representation of each character in the language. The method identifies sub-words in the text, where each sub-word is an intra-connected portion of a word bounded by a break in the cursive text. Each sub-word is encoded into a sequence of directional vectors in a plane. The sequence of directional vectors is processed by a non-deterministic state machine, to determine the sequence of characters in the text corresponding to the sub-words. The state machine retrieves the next vector sequence from the encoded sequence of vectors, and compares the vector sequence with the first set of language-specific rules. If a vector sequence is recognized as a character (i.e., matches an entry in the language-specific rules), the state machine parses the text by entering a character marker after the vector sequence. Once all vector sequences of a particular sub-word are recognized, the state machine proceeds to the next sub-word. However, if not all vector sequences contribute to recognition of all the characters (i.e., if an accept marker does not immediately precede the end of a sub-word), then the entire sequence of vectors corresponding to the sub-word is reparsed, by moving the character marker forward or backward one vector sequence at a time, until each vector sequence contributes to the recognition of all the characters of the sub-word. If the state machine cannot recognize all characters even after reparsing, another set of language-specific rules are retrieved. The state machine then compares the vector sequence to the elements in the second set of language-specific rules, to try and recognize the characters. If all available sets of language-specific rules have been consulted and there is no match, the vector sequence is indicated as unrecognized.

U.S. Pat. No. 6,920,247 to Mayzlin et al, entitled "Method for optical recognition of a multi-language set of letters with diacritics", is directed to a method for character recognition in text containing characters with diacritics. The first step in the method involves digitizing a form document containing text. A text field is located and selected in the digitized image for subsequent recognition. The text field is processed to ensure that the individual characters are confined within predetermined dimensional boundaries. The number of characters in the text field is determined, each character is isolated, and the recognition is performed upon the isolated character. The character is classified based on character type and language, and noise removal is performed. The base of the character is then separated from the diacritic, by constructing a bounding box encompassing the base, and a bounding box encompassing each of the diacritics. If no diacritic was determined, the character undergoes whole character recognition. If a diacritic was determined, the boundaries of the diacritic are first determined, followed by recognition of the diacritic. A copy of the character image is created without the diacritic boundary marks, and recognition is performed on the base of the character. Subsequently, a diacritic matching algorithm is performed to determine if the diacritic can be used in combination with the base of the character. If an acceptable matching combination between the base and diacritic is found for a particular language, the base and diacritic combination is recognized accordingly.

"A New Pattern Matching Approach to the Recognition of Printed Arabic" by Obaid, p. 106-111 [http://acl.ldc.upenn.edu/W/W98/W98-1015.pdf] discusses a segmentation-free method for optical character recognition of printed Arabic text. The text first undergoes pre-processing, which includes minor noise removal, skew correction, line separation, normalization of text lines, word separation, dot extraction, thinning of isolated words, and smoothing of word skeletons. Special points are identified in the interior of the characters of the text (referred to as "focal points"). The focal points are, for example, line ends, junctions, or special patterns, and are selected to be easy to detect, immune to distortions, and of pronounced appearance in all font variations. A series of markers (referred to as "N-markers") are distributed over each character, in a certain position relative to the focal point. The different characters are then classified based on the focal points and marker configurations. The precise combination of the presence or absence of different types of N-markers serves to distinguish the characters from one another. Afterwards, post-processing is performed to correct recognition errors and other side effects. Post-processing includes utilizing "redundancy removal rules" for designing efficient N-marker configurations; utilizing "dot and 'Hamza' association rules" for recognition of characters differentiated solely by the presence of dots or Hamza'; "ambiguity resolution rules" for handling ambiguities between 'Hamza' and dots in poor quality text; and utilizing "combining shape rules" for connecting sub-characters into characters.

SUMMARY OF THE DISCLOSED TECHNIQUE

In accordance with the disclosed technique, there is thus provided a non-segmentation based method for online character recognition of Arabic text. The method includes the procedures of receiving handwritten Arabic text from a user in the form of handwriting strokes, and sampling the handwriting strokes to acquire a sequence of two-dimensional point representations thereof, including associated temporal data. The method further includes the procedures of geometrically pre-processing and extracting features on the point representations, detecting delayed strokes and word-parts in the pre-processed point representations, and projecting the delayed strokes onto the body of the word-parts. The method further includes the procedures of constructing feature vector representations for each word-part, thereby generating an observation sequence, and determining the word with maximum probability given the observation sequence, resulting in a list of word probabilities. A Viterbi algorithm is used to determine the word with maximum probability.

The method further includes the procedure of providing at least one word having the highest resultant word probability, to be user selectable when more than one word is provided. The method also includes developing a respective probabilistic model for each letter-shape, based on a series of received predetermined words, during an initial training stage. The probabilistic model is generally a Hidden Markov Model.

In accordance with the disclosed technique, there is further provided a system for online character recognition of Arabic text. The system includes a user handwriting strokes interface, a character recognition processor, and a storage unit. The character recognition processor is coupled with the user handwriting strokes interface. The storage unit is coupled with the user handwriting strokes interface and with the character recognition processor. The user handwriting strokes interface receives handwritten Arabic text from a user in the form of handwriting strokes. The character recognition processor samples the handwriting strokes to acquire a sequence of two-dimensional point representations thereof, including associated temporal data. The character recognition processor further geometrically pre-processes and extracts features from the point representations. The character recognition processor further detects delayed strokes and word-parts in the pre-processed point representations, and projects the delayed strokes onto the body of the word-parts. The character recognition processor further constructs feature vector representations for each word-part, thereby generating an observation sequence, and determines the word with maximum probability given the observation sequence, resulting in a list of word probabilities. The storage unit includes at least a database of Hidden Markov Models, and a database of a word dictionary.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a non-segmentation based method for online recognition of handwritten Arabic script in real-time. The method incorporates delayed strokes in the text as part of the recognition. The method uses a discrete Hidden Markov Model (HMM) to represent each of the letter-shapes in the Arabic alphabet. For each word in the text, the method determines the most likely word that was written (i.e., having the highest probability in the HMM).

The disclosed technique is applicable to any text written with the Arabic alphabet. It is appreciated that the disclosed technique is also applicable to text written with an adapted Arabic alphabet, used to accommodate languages other than Arabic (e.g., the Persian language, the Urdu language, the Kurdish language, and the like).

The term "letter-shape" herein below refers to a unique shape of a letter in the Arabic alphabet. Each letter may have several different letter-shapes, depending on the position of the letter within a word. For example, the letter ه (heh) has four different letter-shapes: ه (isolated); ه (initial); ـهـ (medial); and ـه (final).

The term "word-part" herein below refers to an intra-connected portion of a word, which is bounded on each side by a minimal amount of space in the text. The space between consecutive word-parts within a word is usually much smaller than the space between consecutive words in the text. For example, the word: موسيقى (mooseeqa) [music] contains two word-parts: مو; and سيقى.

The term "delayed stroke" herein below refers to any of the dots or strokes written above, below, or attached to the letter body of a letter in the Arabic alphabet. A delayed stroke may intersect a word-part. The dots above the letter-shapes ث (theh—isolated) and ت (the—isolated), the dots below the letter-shapes ج (jeem—initial) and ي (yeh—isolated), and the stroke in the letter-shape ك (kaf—isolated), are all examples of delayed strokes.

Figure 1:
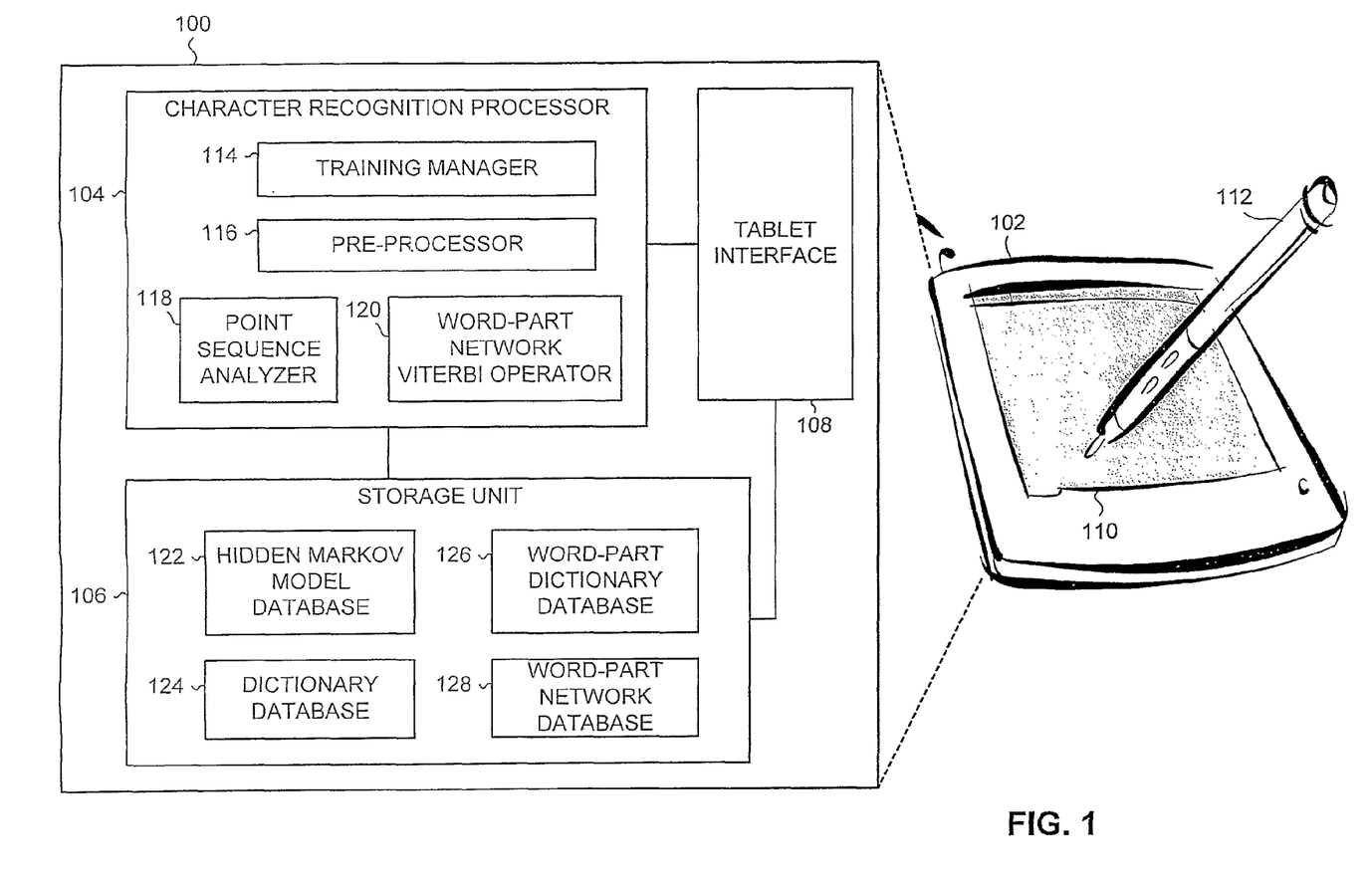
FIG. 1 is a schematic illustration of a system for online recognition of handwritten Arabic script in real-time, constructed and operative in accordance with an embodiment of the disclosed technique.

Reference is now made to FIG. 1, which is a schematic illustration of a system, generally referenced 100, for online recognition of handwritten Arabic script in real-time, constructed and operative in accordance with an embodiment of the disclosed technique. System 100 operates on a graphics tablet 102. Alternatively, system 100 operates on a computer that is coupled to graphics tablet 102. System 100 is typically an interactive system, which is continuously responsive to user input. System 100 includes a character recognition processor 104, a storage unit 106, and a tablet interface 108. Graphics tablet 102 includes an input screen 110 and a tablet pen 112. Character recognition processor 104 includes a training manager 114, a pre-processor 116, a point sequence analyzer 118, and a word-part network Viterbi operator 120. Storage unit 106 includes a Hidden Markov Model database 122, a dictionary database 124, a word-part dictionary database 126, and a word-part network database 128. Character recognition processor 104 is coupled with storage unit 106 and with tablet interface 108. Storage unit 106 is further coupled with tablet interface 108.

Graphics tablet 102 is any device that is capable of detecting and acquiring handwritten strokes. A user writes text on input screen 110 of graphics tablet 102 using tablet pen 112. Tablet pen 112 may be any type of writing instrument that can be used to enter text upon contact with input screen 110. Alternatively, the user writes text without a writing instrument, such as by using a finger. Input screen 110 may respond to any type of external stimulus. For example, input screen 110 may be pressure sensitive, touch sensitive, light sensitive, and the like.

The method of the disclosed technique includes a training stage and a recognition stage. In the training stage, system 100 learns the Arabic alphabet and generates a Hidden Markov Model (HMM) to represent each letter-shape in the Arabic alphabet. It is noted that system 100 may use other types of probabilistic models for representing each letter-shape. System 100 further generates dictionaries of all the words and all the word-parts learned in the training stage. In the recognition stage, system 100 performs the actual recognition of handwritten text, using the information learned during the training stage.

Figure 2:
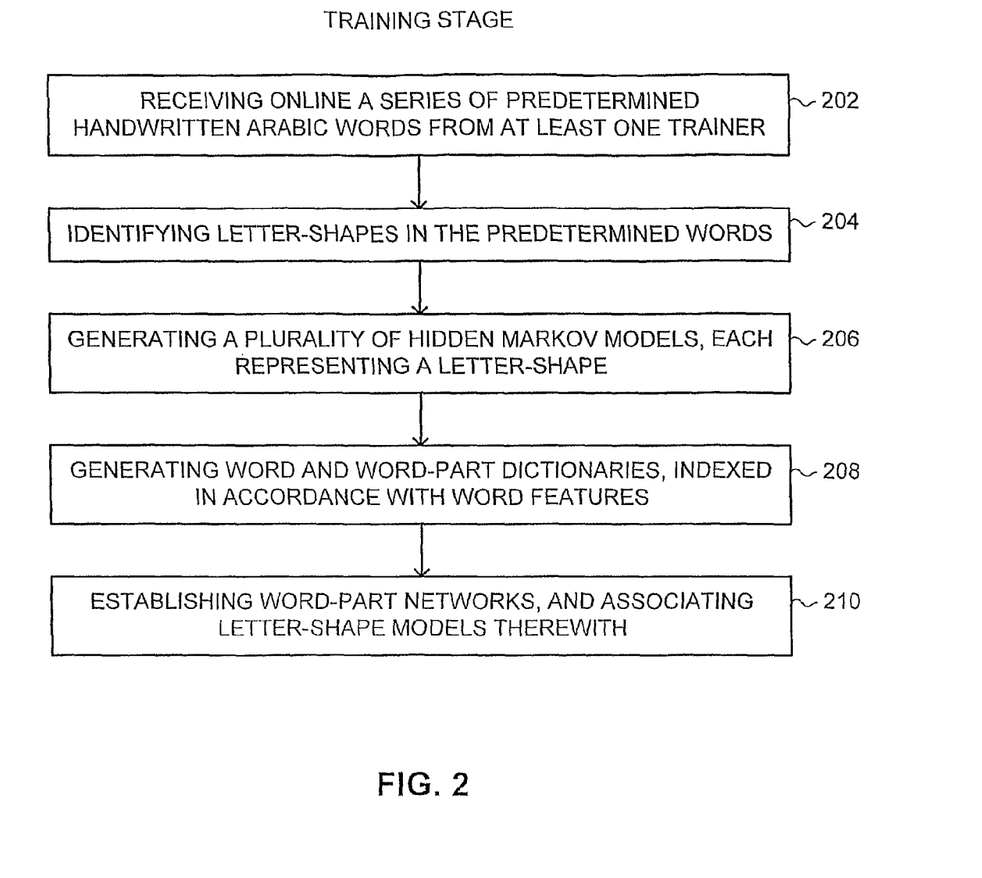
FIG. 2 is a schematic illustration of a method for a training stage for online recognition of handwritten Arabic script in real-time, operative in accordance with another embodiment of the disclosed technique.

Reference is now made to FIG. 2, which is a schematic illustration of a method for a training stage for online recognition of handwritten Arabic script in real-time, operative in accordance with another embodiment of the disclosed technique. In procedure 202, a series of predetermined handwritten Arabic words are received online from at least one trainer. Each trainer writes a series of predetermined Arabic words on input screen 110 of graphics tablet 102, with reference to FIG. 1. Training manager 114 prompts each trainer to write a number of selected words (e.g., a few hundred words). Tablet interface 108 presents the selected words on input screen 110. The selected words include each type of Arabic letter-shape at least once (e.g., two or three times), with each letter-shape included roughly the same number of times (i.e., there is a uniform distribution of all the letter-shapes). The selected words may vary for different training sessions. A trainer may be required to repeat the process of writing one or more of the selected words (i.e., following instructions from training manager 114). Several trainers (e.g., five or ten) may perform this procedure, with each trainer having a unique writing style. Typically, different trainers exhibit sufficient similarity in writing a particular letter-shape, which enables system 100 to subsequently identify that letter-shape independent of who wrote it. During the recognition stage, system 100 may recognize the handwriting of a person who did not participate as a trainer during the training stage (i.e., system 100 is "writer independent"). It is noted that the entire training stage is generally performed once, with each trainer entering a number of training words during an individual training session.

In procedure 204, letter-shapes are identified in the series of predetermined words. With reference to FIG. 1, training manager 114 analyzes each of the received predetermined words and attempts to identify the different letter-shapes in that word. Training manager 114 uses various rules to help determine whether a possible letter-shape is actually a true letter-shape. Such rules may include the number and the placement of delayed strokes above or below the letter body.

Training manager 114 determines the boundaries between consecutive letter-shapes, to indicate where each individual letter-shape begins and ends. The boundaries must separate the letter-shapes, such that all the delayed strokes of a letter-shape are within the boundaries. Tablet interface 108 depicts the determined boundaries on input screen 110, such as via a colored line, marking, and the like. The success rate of the determined boundaries increases as the training progresses. The trainer may provide confirmation that the depicted boundaries are indeed accurate. If an inaccurate boundary is depicted, the trainer may manually mark the correct boundaries on input screen 110. Training manager 114 receives the input from the trainer, and updates the boundaries accordingly.

Pre-processor 116 may perform geometric pre-processing and feature extraction on the handwritten text prior to letter-shape identification, in order to minimize variations in different handwriting styles. These processes are elaborated upon herein below in procedure 236 with reference to FIG. 4.

In procedure 206, a plurality of Hidden Markov Models (HMM) is generated, each HMM representing a letter-shape. With reference to FIG. 1, training manager 114 generates a discrete HMM to represent each of the letter-shapes identified in the training words. Training manager 114 determines the HMM parameters, which are the most likely set of state transition and output probabilities, given the identified letter-shapes in the training data as the output sequences. Training manager 114 may utilize the Baum-Welch algorithm, the reversed Viterbi algorithm, or similar techniques known in the art, to determine the HMM parameters. The HMM parameters are: (A, B, π), where A=the matrix of transition probabilities; B=the matrix of output probabilities; and π=the list of states. The list of states $\pi=\{\pi_i\}$ is initialized to: $\pi_1=1$ and $\pi_i=0$ for $1<i\leq N$, where N is the total number of states in the HMM. The transition probability matrix $A=\{a_{ij}\}$ is initialized to: $a_{i,j}=a_{i,k+1}=0.5$, for $1\leq i<N$; $a_{i,j}=0$ where $i\neq j$ and $j\neq i+1$ for $1\leq i<N$, and $a_{N,N}=1$. The output probability matrix $B=\{b_{ij}\}$ is initialized to a uniform distribution. Each state represents a unique permutation of the observed features in the training stage for that letter-shape. Training manager 114 selects a unique number of states (N) for each letter-shape. Training manager 114 tests out all possible state numbers, and selects the number which maximizes the likelihood mean of all instances of that letter-shape appearing in the training data. The number of states generally varies between three and eleven. For example, the isolated letter-shape ش (sheen) is assigned eleven states, while the isolated letter shape ا (alif) is assigned three states.

In procedure 208, word dictionaries and word-part dictionaries are generated, indexed in accordance with word features. With reference to FIG. 1, training manager 114 generates a word dictionary, which includes the entire set of possible valid Arabic words that training manager 114 is able to recognize. The word dictionary may be partially based on a predefined dictionary, which may be obtained from an external library source. Training manager 114 may then use the predefined dictionary to select words for the trainer to write (i.e., in procedure 202). The word dictionary may include slang, abbreviations, acronyms, and the like. The word dictionary may also be updated with new words written by the trainer during the training stage. By only recognizing words located in the word dictionary, rather than attempting to recognize any arbitrary permutation of letters, system 100 is able to achieve high recognition rates.

Training manager 114 divides the word dictionary D into a set of sub-dictionaries $\{D_1, D_2, \ldots, D_n\}$. Each sub-dictionary $D_k$ includes all the words in dictionary D that includes k word-parts. For example, a dictionary D may include the following words: {فادي, رواية, جامعة, ثقافة, التحدي, انسان, وسام, هل, معلم, محمود, محمد}. Training manager 114 then divides dictionary D into the following four sub-dictionaries:

$D_1$={هل, معلم, محمد} (words with one word-part)

$D_2$={محمود, جامعة, ثقافة} (words with two word-parts)

$D_3$={وسام, فادي, التحدي, انسان} (words with three word-parts)

$D_4$=رواية (words with four word-parts).

The dictionaries may contain a feature index, which categorizes each of the words in that dictionary according to various features. These features are elaborated upon with reference to FIG. 4. The number of word-parts is an example of such a feature. The sub-dictionaries $D_k$ may be considered a particular index of dictionary D.

Subsequently, training manager 114 generates a series of "word-part dictionaries". Each word-part dictionary $WPD_{k,i}$ includes all the word-parts of sub-dictionary $D_k$ which is located in index i, with the index position starting from the right. In the example above, training manager 114 generates the following word-part dictionaries for sub-dictionary $D_3$:

$WPD_{3,1} = \{$ ا, فا, و $\}$
$WPD_{3,2} = \{$ سا, د, لتحد, نسا $\}$
$WPD_{3,3} = \{$ م, ي, ن $\}$.

Alternatively, the subdivision of the sub-dictionary $D_k$ into word-part dictionaries $WPD_{k,i}$ is incorporated as a feature index within that sub-dictionary. The word-part dictionaries may be considered a particular index of sub-dictionary $D_k$ (or of dictionary D), which is used to accelerate the subsequent search for the appropriate word.

In such a scheme, we replace the 28 basic letters of the Arabic language by a new alphabet set which is represented by the word-parts. In typical Arabic Language dictionary, the number of different word-parts is between 30,000 and 40,000. When ignoring the dots this number drops to several thousands.

In procedure 210, word-part networks are established for each word-part dictionary, and the corresponding letter-shape models are associated therewith. With reference to FIG. 1, training manager 114 establishes a word-part network corresponding to each word-part dictionary. Each word-part network $WPN_{k,j}$ is a data tree structure that includes all the word-parts of word-part dictionary $WPD_{k,i}$. Each node in the data tree structure represents a letter-shape. A path from the root node to a particular internal node represents a word-part. The HMM representing each letter-shape is further associated with each node in the word-part network.

Figure 3A:
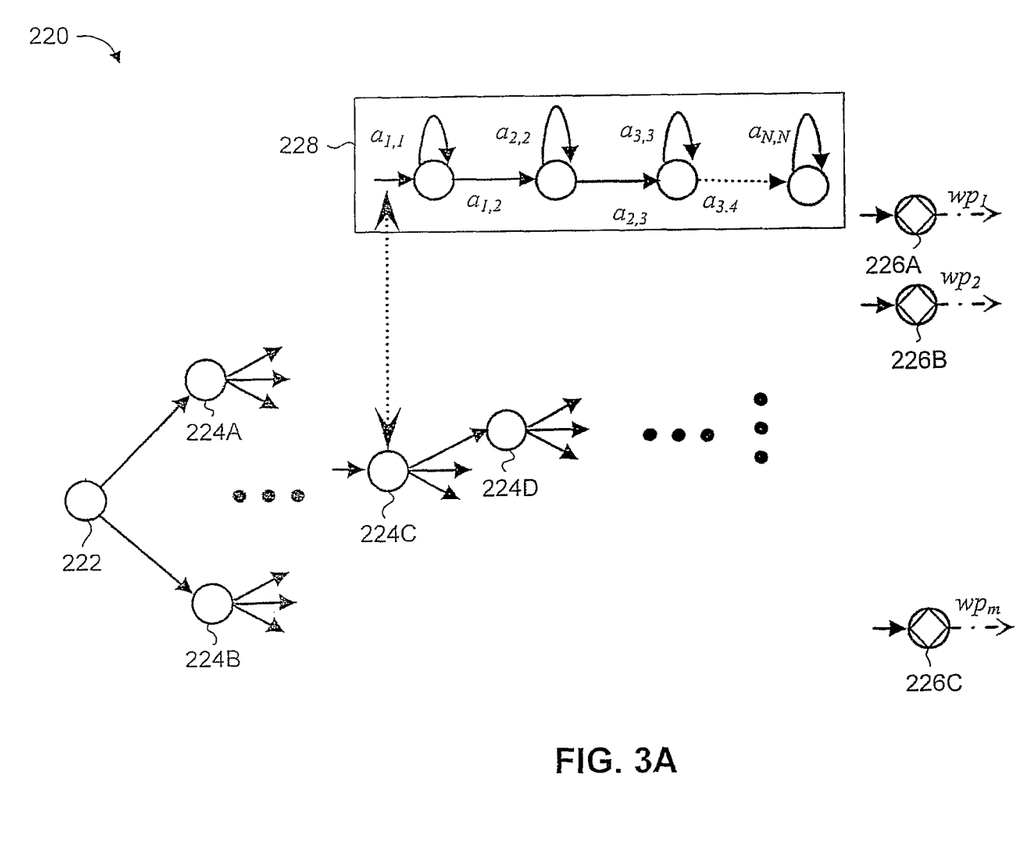
FIG. 3A is a schematic illustration of a general word-part network.

Reference is now made to FIG. 3A, which is a schematic illustration of a word-part network, generally referenced 220. Word-part network 220 includes a root node 222, and a plurality of internal nodes 224A, 224B, 224C, 224D, 226A, 226B and 226C. The internal nodes which end a word-part include a word-part terminator. Internal nodes 226A, 226B and 226C each have a word-part terminator (depicted by a diamond in FIG. 3A). A path from root node 222 to one of internal nodes 226A, 226B and 226C represents a particular word-part in word-part network 220. It is noted that not every path from the root node to an internal node having a word-part terminator represents a valid sub-word, but rather, it is dependent on the particular path taken.

The size (j) of word-part network 220 ($WPN_{k,j}$) is the number of word-parts in the corresponding word-part dictionary ($WPD_{k,i}$). The root node is selected to represent the first letter of the word-part. Alternatively, the root node is selected to represent the last letter of the word-part. Arabic word-parts (except for the last word-part in a word) always end with one of six disconnective letters (i.e., letters that do not connect to the following letter), therefore using the last letter to represent the root node reduces the size of the word-part network. HMM 228 is the HHM representing the letter-shape of node 224C. It is noted that a single word-part may be represented more than once in the word-part network (i.e., there may be more than one path in the word-part network to reach a single word-part).

Figure 3B:
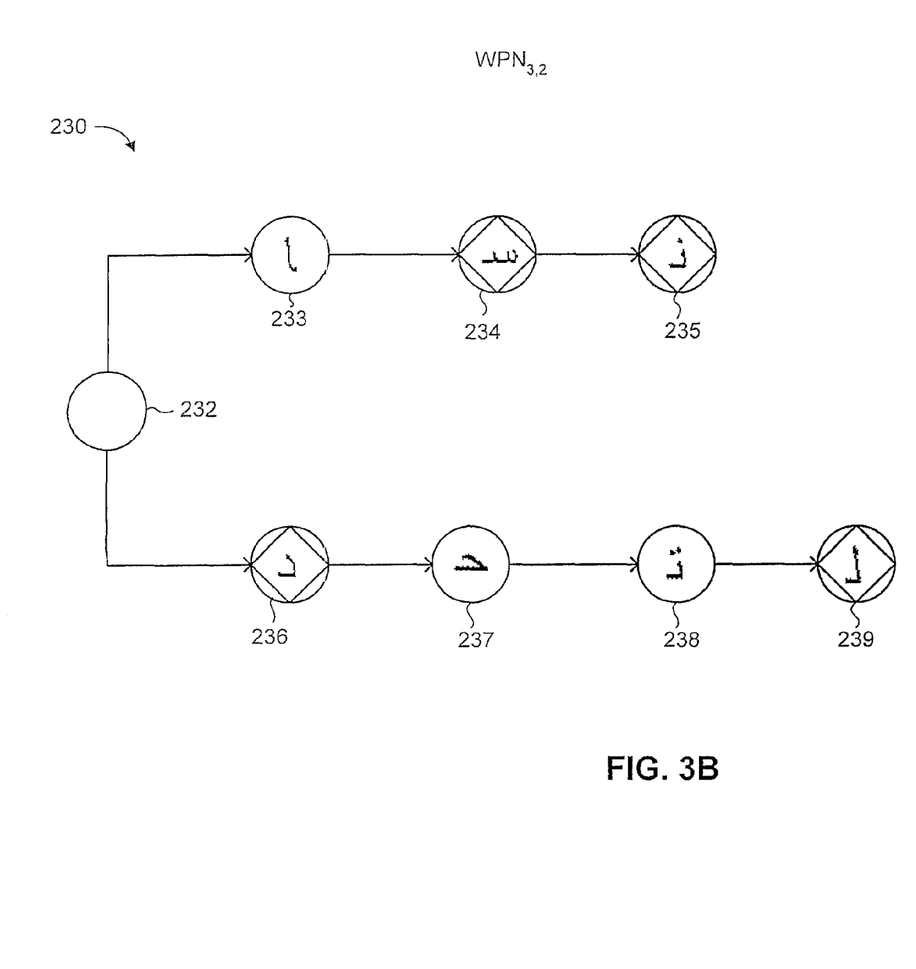
FIG. 3B is a schematic illustration of the word-part network for word-part dictionary $WPD_{3,2}$.

Reference is now made to FIG. 3B, which is a schematic illustration of the word-part network, generally referenced 230, for word-part dictionary $WPD_{3,2}$ previously discussed in the above example. Word-part network 230 includes a root node 232, and a plurality of internal nodes 233, 234, 235, 236, 237, 238 and 239. Each internal node in word-part network 230 represents a particular letter-shape. The path from root node 232 to an internal node having a word-part terminator (depicted by a diamond in FIG. 3B) represents a particular word-part of word-part dictionary $WPD_{3,2}$. For example, the path from node 232 to node 233 to node 234 to node 235 represents word-part نسا. The path from node 232 to node 236 to node 237 to node 238 to node 239 represents word-part لتحد. The path from node 232 to node 236 represents word-part د. The path from node 232 to node 233 to node 234 represents word-part سا.

Figure 4:
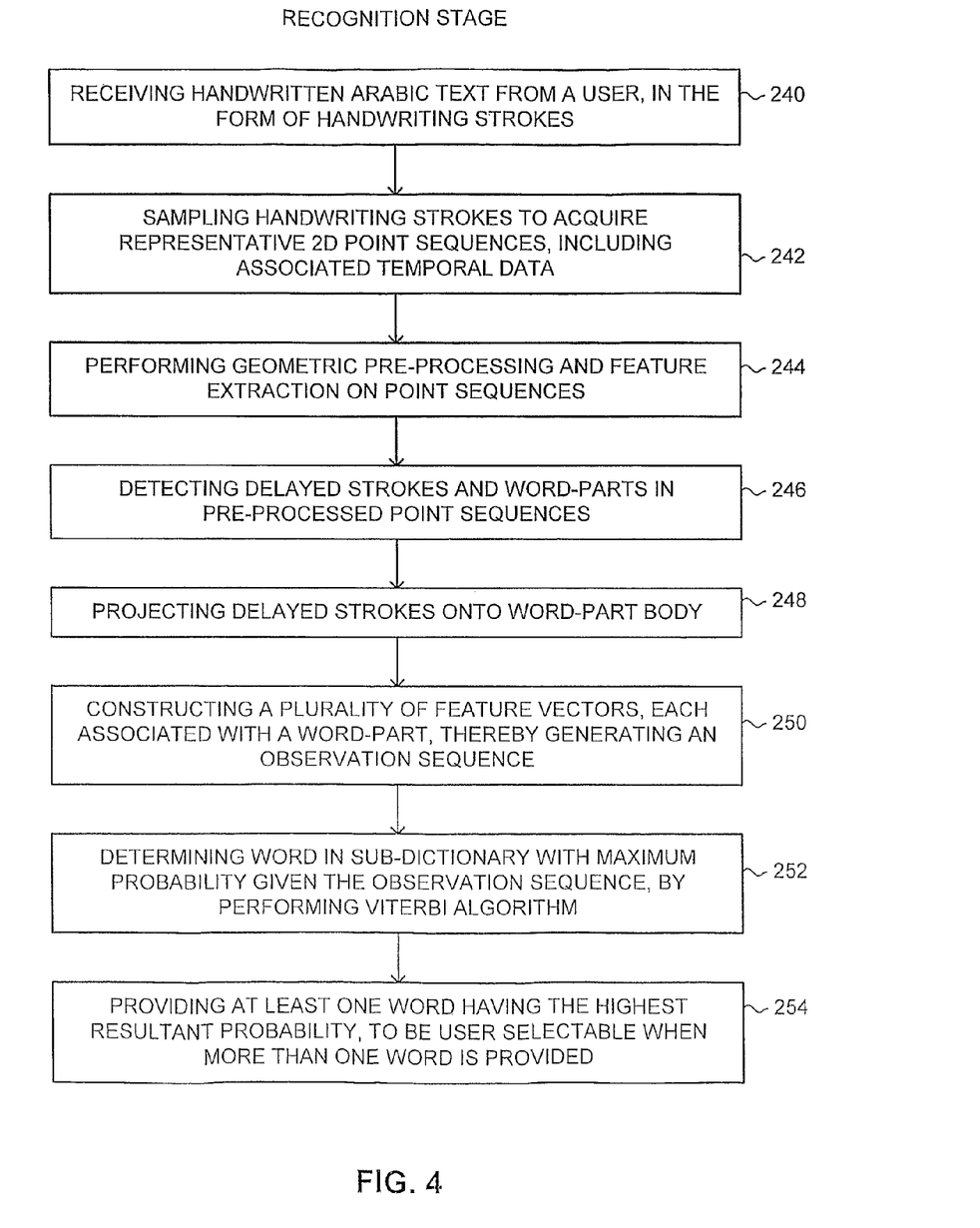
FIG. 4 is a schematic illustration of a method for a recognition stage for online recognition of handwritten Arabic script in real-time, operative in accordance with a further embodiment of the disclosed technique.

Reference is now made to FIG. 4, which is a schematic illustration of a method for a recognition stage for online recognition of handwritten Arabic script in real-time, operative in accordance with a further embodiment of the disclosed technique. In procedure 240, handwritten Arabic text is received from a user, in the form of handwriting strokes. The user writes down Arabic text on input screen 110 of graphics tablet 102 with reference to FIG. 1. The user uses a writing instrument associated with graphics tablet 102, such as tablet pen 112. Tablet interface 108 detects the handwriting strokes of the written text, where each handwriting stroke is a single movement of tablet pen 112 on input screen 110.

In procedure 242, the handwriting strokes are sampled to acquire representative two-dimensional point sequences, including the associated temporal data. With reference to FIG. 1, tablet interface 108 performs temporal sampling of tablet pen 112 as the user is writing the text. Tablet interface 108 acquires a series of point sequences that represents the geometric shape of the text being written. Tablet interface 108 further obtains temporal information associated with the point sequences (i.e., the relative order in which the various handwriting strokes were written).

In one embodiment of the disclosed technique, tablet interface 108 is a user handwriting strokes interface, which receives handwriting strokes from a user writing with a special writing instrument. For example, the user writes with a digital pen equipped with motion tracking devices, and the user handwriting strokes interface detects the handwriting strokes of the user via sensors coupled with the motion tracking devices and with system 100.

In procedure 244, the acquired point sequences are geometrically pre-processed and features are extracted. With reference to FIG. 1, pre-processor 116 first performs geometric pre-processing on the point sequences, in order to minimize variations in different handwriting styles. The pre-processing may include reducing noise and imperfections resulting from the acquisition process of graphics tablet 102, such as by applying a low-pass filter with a rectangle-window on the point sequences. If the user writes substantially slowly, tablet interface 108 acquires a substantially large number of point sequences to represent a particular geometric shape, resulting in redundant point samples for processing. Therefore, the pre-processing may also include simplifying the point sequences, by eliminating redundant points that are irrelevant for pattern classification. This may be achieved by eliminating points within a span that exceed an empirically determined tolerance value. Alternatively, tablet interface 108 may reduce the sampling rate (i.e., the rate at which the point sequences are acquired). If the user writes substantially quickly, tablet interface 108 acquires a substantially small number of point sequences to represent a particular geometric shape, resulting in too few point samples for processing. Therefore, the pre-processing may also include interpolation of the point sequences. Alternatively, tablet interface 108 may increase the sampling rate. If the speed at which the user writes changes substantially (i.e., the user writes substantially quickly during a portion of the time, and substantially slowly during another portion of the time), tablet interface 108 acquires a small number of point sequences during a portion of the time, and a large number of point sequences during another portion of the time, resulting in both too few point samples and redundant point samples. Therefore, the pre-processing may further include writing-speed normalization (i.e., adjusting for differences respective of the speed which the user writes), such as by re-sampling the point sequences. The re-sampled point sequences are spaced out in a substantially uniform manner.

Subsequently, pre-processor 116 performs feature extraction on the pre-processed point sequences. The features extracted provide distinctive information associated with the letter-shape, to assist subsequent recognition by reducing the search domain when attempting to identify the word. One example of a feature is the local-angle feature. The local-angle feature is the angle between each vector (i.e., the vector between two adjacent points) $v=p_{i-1}p_i$, $i>1$ in the point sequence and the x-axis. The local angle feature is an example of a local feature. Local features capture information relating to a sample point or a small number of adjacent points in a local region, independent of the wider geometric shape of the text. In contrast, global features capture information relating to the wider geometric shape of a large number of points.

Another example of a feature is the super-segment feature. The super-segment feature is the global feature equivalent to the local angle feature. The super-segment feature is the angle between each skeleton vector (i.e., the vector between two adjacent skeleton points) in a skeleton point sequence and the X-axis. The skeleton points are first computed by eliminating points in the point sequence which exceed a certain tolerance value.

A further example of a feature is the loop feature. The loop feature is also a type of global feature. The loop feature indicates the presence of a loop in the point sequence (e.g., the letter-shape:  contains a loop). If a point is part of a loop, the loop feature is set as positive for that point. Similar global features are cusps and crossings, which indicate the presence of a cusp or a crossing in the point sequence (e.g., the word: منفضلك (minfadlik) [please] includes a cusp, where the letter ل (lam) was written).

Other possible features detected during pre-processing may include the number of closed curves in the letter-shape, the number of "teeth" or indented sections in the letter-shape (e.g., the letter-shape:  has three teeth), and whether the letter-shape begins with a curved shape. Further examples of features include: the number of delayed strokes associated with a word-part, the type of delayed stroke (i.e., a dot or stroke), the location of a delayed stroke relative to a word-part (i.e., above, below, or attached thereto), the position of the loop in the word-part, and the like.

In procedure 246, delayed strokes and word-parts are detected in the pre-processed point sequences. With reference to FIG. 1, point sequence analyzer 118 first detects word-parts in the point sequences. Point sequence analyzer 118 then detects delayed strokes in the point sequence, and associates each delayed stroke with a word-part body (i.e., the word-part without any delayed strokes). Point sequence analyzer 118 identifies the delayed strokes, based on the location and size of the strokes, as well as the timing (i.e., when the user wrote the stroke). Delayed strokes are written above or below the word-part, and may appear before, after, or within the word-part with respect to the horizontal axis. Delayed strokes are typically written after the word-part body.

Figure 5A:
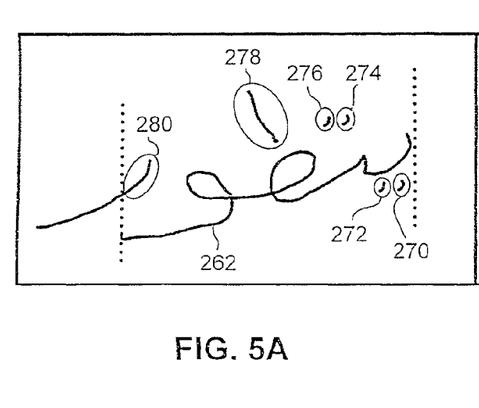
FIG. 5A is a schematic illustration of a pattern of delayed strokes relative to a word-part.
Figure 5B:
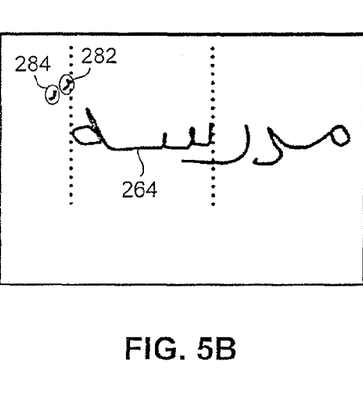
FIG. 5B is a schematic illustration of another pattern of delayed strokes relative to a word-part.
Figure 5C:
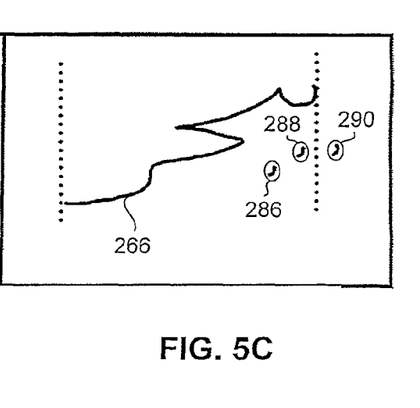
FIG. 5C is a schematic illustration of a further pattern of delayed strokes relative to a word-part.

Reference is now made to FIGS. 5A, 5B and 5C. FIG. 5A is a schematic illustration of a pattern of delayed strokes relative to a first word-part, referenced 262. FIG. 5B is a schematic illustration of another pattern of delayed strokes relative to a second word-part, referenced 264. FIG. 5C is a schematic illustration of a further pattern of delayed strokes relative to a third word-part, referenced 266. With reference to FIG. 5A, point sequence analyzer 118 detects word-part 262. Point sequence analyzer 118 generates boundary lines (indicated by dotted lines) around word-part 262. Point sequence analyzer 118 searches for additional markings within the region encompassed by the boundary lines. Point sequence analyzer 118 detects markings 270, 272, 274, 276, 278 and 280 within the region. Point sequence analyzer 118 identifies markings 270, 272, 274, 276 and 278 as delayed strokes associated with word-part 262. Point sequence analyzer 118 identifies marking 280 as a segment of the word-part following word-part 262, rather than a delayed stroke. It is noted that delayed strokes 270 and 272 are located below word-part 262, while delayed strokes 274, 276 and 278 are located above word-part 262.

With reference to FIG. 5B, point sequence analyzer 118 detects word-part 264. Point sequence analyzer 118 generates boundary lines (indicated by dotted lines) around word-part 264. Point sequence analyzer 118 searches for additional markings within the region encompassed by the boundary lines. Point sequence analyzer 118 detects no markings within the region. Point sequence analyzer 118 then searches for markings outside the boundary lines, (i.e., before the start boundary and after the end boundary of word-part 264). Point sequence analyzer 118 detects markings 282 and 284 in the region following word-part 264 (i.e., after the boundary line marking the end of word-part 264). Point sequence analyzer 118 detects no word-part immediately following word-part 264, and therefore identifies markings 282 and 284 as delayed strokes associated with word-part 264 (i.e., and not associated with a different word-part).

With reference to FIG. 5C, point sequence analyzer 118 detects word-part 266. Point sequence analyzer 118 generates boundary lines (indicated by dotted lines) around word-part 266. Point sequence analyzer 118 searches for additional markings within the region encompassed by the boundary lines. Point sequence analyzer 118 detects markings 286 and 288 within the region. Point sequence analyzer 118 identifies markings 286 and 288 as delayed strokes associated with word-part 266. Point sequence analyzer 118 further searches for markings outside the boundary lines. Point sequence analyzer 118 detects an additional marking 290 in the region previous to word-part 264 (i.e., before the boundary line marking the start of word-part 264). Point sequence analyzer 118 identifies word-part 266 as the first word-part of a word, and therefore identifies marking 290 as a delayed stroke associated with word-part 266.

In procedure 248, the delayed strokes are projected onto the word-part body. With reference to FIG. 1, point sequence analyzer 118 projects each of the delayed strokes associated with a particular word-part onto that word-part body. Point sequence analyzer 118 performs the projection by creating a virtual vector extending from the first point of the point sequence representing the delayed stroke, to a point ($p_i$) on the point sequence representing the word-part body associated with the delayed stroke. Point sequence analyzer 118 further creates a virtual vector extending from the last point of the delayed stroke point sequence, to the next point ($p_{i+1}$) on the word-part point sequence. Point sequence analyzer 118 creates a new point sequence representing both the word-part and the delayed stroke. The new point sequence includes the points of the word-part, the points of the delayed stroke, and the "virtual points" of the virtual vector connecting the delayed stroke to the word-part.

Figure 6A:
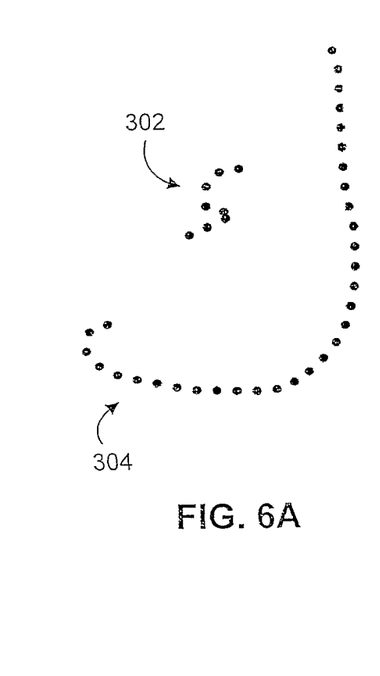
FIG. 6A is a schematic illustration of a delayed stroke point sequence and the associated word-part point sequence.
Figure 6B:
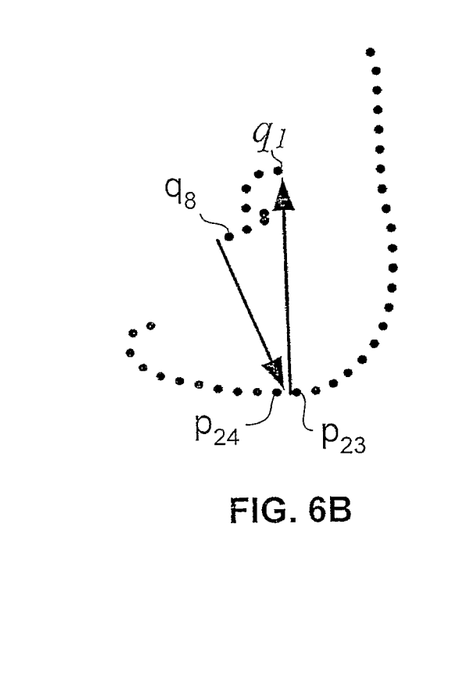
FIG. 6B is a schematic illustration of the projection of the delayed stroke onto the word-part of FIG. 6A.
Figure 6C:
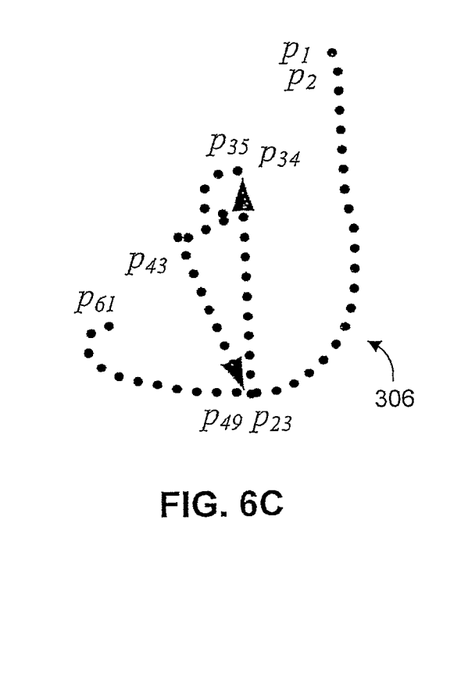
FIG. 6C is a schematic illustration of a new point sequence representing the delayed stroke projected onto the word-part of FIG. 6A.

Reference is now made to FIGS. 6A, 6B and 6C. FIG. 6A is a schematic illustration of a delayed stroke point sequence, referenced 302, and the associated word-part point sequence, referenced 304. FIG. 6B is a schematic illustration of the projection of the delayed stroke onto the word-part of FIG. 6A. FIG. 6C is a schematic illustration of a new point sequence, referenced 306, representing the delayed stroke projected onto the word-part of FIG. 6A. With reference to FIG. 6A, point sequence analyzer 118 detects a point sequence representing a delayed stroke 302, and a point sequence representing a letter-shape 304, which is part of a larger word-part (not shown). Delayed stroke point sequence 302 represents the letter ء (hamza). Word-part point sequence 304 represents the letter ل (lam).

With reference to FIG. 6B, point sequence analyzer 118 creates a virtual vector, which extends from the first point of delayed stroke point sequence 302 (i.e., point $q_1$), to the point on letter-shape point sequence 304 that is a vertical projection of point $q_1$ (i.e., point $p_{23}$). Point sequence analyzer 118 creates an addition virtual vector, which extends from the last point of delayed stroke point sequence 302 (i.e., point $q_8$), to the point on letter-shape point sequence 304 immediately following the vertical projection of point $q_1$ (i.e., point $p_{24}$).

With reference to FIG. 6C, point sequence analyzer 118 creates a new point sequence 306 representing delayed stroke point sequence 302 projected onto letter-shape point sequence 304. Point sequence 306 incorporates the points of the virtual vectors into the word-part body. In particular, point sequence 306 includes all the points starting from the first point of letter-shape point sequence 304 (i.e., point $p_1$), to the vertical projection of point $q_1$ (i.e., point $p_{23}$), to the first point of delayed stroke point sequence 302 (i.e., point $q_1$), to the last point of delayed stroke point sequence 302 (i.e., point $q_8$), to the point on letter-shape point sequence 304 immediately following the vertical projection of point $q_1$ (i.e., point $p_{24}$), to the last point of letter-shape point sequence 304 (i.e., point $p_{61}$).

Figure 7A:
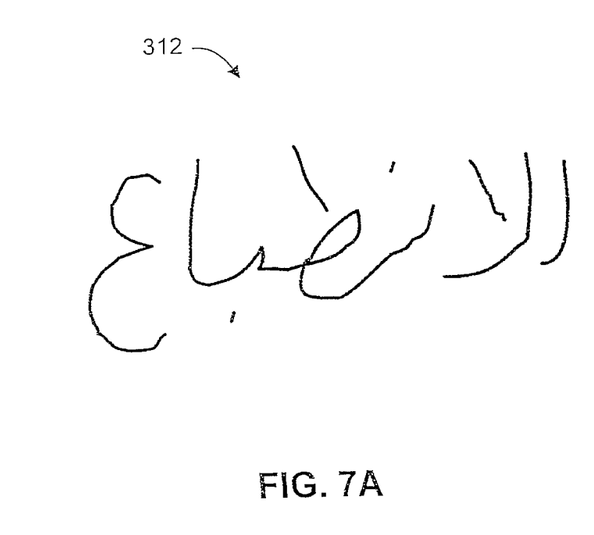
FIG. 7A is a schematic illustration of a pattern of delayed strokes relative to a word-part.
Figure 7B:
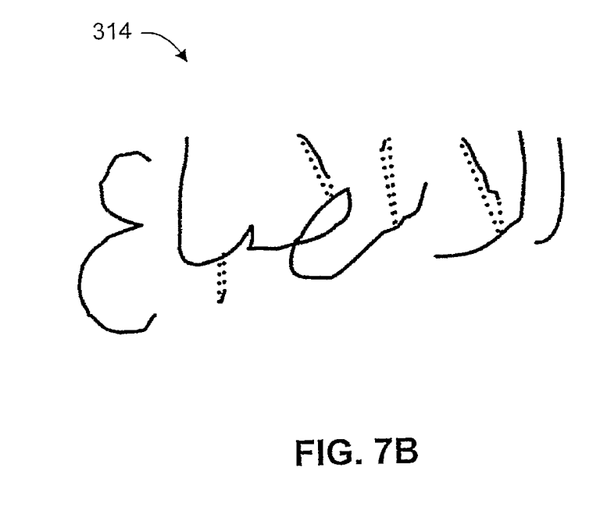
FIG. 7B is a schematic illustration of the projection of delayed strokes onto the word-part of FIG. 7A.

It is noted that a delayed stroke may appear before or after the word part body, (i.e., the vertical projection of the first point of the delayed stroke point sequence does not result in a point on the word-part point sequence), such as with delayed stroke 284 and word-part 264 with reference to FIG. 5B. In this case, point sequence analyzer 118 projects the delayed stroke onto the nearest point of the associated word-part body. Reference is now made to FIGS. 7A and 7B. FIG. 7A is a schematic illustration of a pattern of delayed strokes relative to a word-part, generally referenced 312. FIG. 7B is a schematic illustration of the projection of delayed strokes onto the word-part of FIG. 7A, generally referenced 314.

Referring back to FIG. 4, in procedure 250, a plurality of feature vectors are constructed, each feature vector associated with a word-part, thereby generating an observation sequence. With reference to FIG. 1, point sequence analyzer 118 constructs a feature vector for each word-part, where the feature vector represents the feature information extracted from the word-part point sequence in procedure 244. For example, the feature vector contains information summarizing the local-angle feature, the super-segment feature, and the loop feature for the word-part. It is noted that in the training stage, the feature vector represents features of the component letter-shapes, whereas in the recognition stage, the feature vector represents features of a word-part.

The feature vector is constructed as a sequence of discrete values. For example, each feature vector is an integer value ranging from 0-260. The first four bits represent the angle value of the local-angle feature for the word-part (i.e., discretized to 16 blocks). The next three bits represent the angle value of the super-segment feature for the word-part (i.e., discretized to 8 blocks). The next bit represent the loop feature for the word-part (i.e., binary discretization, whether there is a loop or not). The remaining values of the feature vector represent the virtual vectors, or the projected delayed stroke associated with the word-part. The feature vector representing the word-part corresponds to an observation ($O_i$), with respect to the HMMs developed in the training stage. Point sequence analyzer 118 thereby generates an observation sequence ($O_s=[O_1, O_2, \ldots, O_k]$), consisting of the series of observations (i.e., feature vectors) for each detected word-part in the text.

In procedure 252, the word in the sub-dictionary with maximum probability given the observation sequence is determined, by performing the Viterbi algorithm. With reference to FIG. 1, word-part network Viterbi operator 120 determines the word with the highest output probabilities of the HMM of the component letter-shapes, given the generated observation sequence ($O_s$) for the component word-parts of that word. In particular, word-part network Viterbi operator 120 seeks to maximize:

$$P(W \mid O_s) = \prod_{i=1}^{k} P(wp_i \mid O_i),$$

where $P(wp_i|O_i)=P(O_i|wp_i)P(wp_i)/P(O_i)$. This formula can be reduced to maximizing: $P(O_i|wp_i)$, since $P(O_i)$ is the same for all word-parts, with the assumption that all word-parts in dictionary have an equal probability of occurring in the text. Word-part network Viterbi operator 120 implements the Viterbi algorithm to determine the highest probability word for a word-part network ($WPN_{k,j}$). Word-part network Viterbi operator 120 utilizes only information concerning the final probability for a given word, regardless of the particular path in the word-part network which reaches that word (i.e., for each of the component word-parts of the word). Word-part network Viterbi module 120 may repeat the Viterbi analysis for several iterations, with each iteration producing a slightly different result, and selecting the highest probability word out of all the iterations satisfying statistical criteria (e.g., the average result). Word-part network Viterbi operator 120 may examine the feature index prior to implementing the Viterbi algorithm, and proceed to only analyze the word-parts that match the criteria in the feature index. As a result, the number of HMMs for each word-part to be computed is reduced, thereby speeding up the overall running time of the computation.

In procedure 254, at least one word is provided having the highest resultant probability, to be user selectable when more than one word is provided. With reference to FIG. 1, system 100 provides the user with the highest probability word as computed by the Viterbi algorithm in procedure 252, such as by displaying the word on input screen 110 of graphics tablet 102. If the probability of an individual word is greater than the probability of all other words in the dictionary by more than a threshold value, then system 100 provides that word alone to the user. The threshold value is determined empirically (e.g., based on a clustering algorithm). This word is recognized by system 100 as the word written by the user in the received text.

System 100 may alternatively display the word on an external display device. System 100 may further alternatively provide an audio notification of the word to the user (e.g., by sounding an audio clip of the word).

If the probability of an individual word is not greater than the probability of all other words in the dictionary by more than a threshold value, then system 100 provides a list of the highest probability words resulting from the Viterbi algorithm to the user, and awaits user feedback. Tablet interface 108 displays a list of the highest probability words (e.g., the top four or five words) on input screen 110 of graphics tablet 102, and prompts the user to select the displayed word which accurately represents the word written by the user in the received text. After the user selects the word, system 100 updates the word accordingly in the appropriate word dictionary database. In particular, the HMMs associated with the selected word are updated according to the features of the input text. The user may indicate that none of the displayed words accurately represents the word written by the user (e.g., by selecting a "none of the above" option), in which case system 100 may display a list of the next highest probability words resulting from the Viterbi algorithm (e.g., the next top four or five words). If the true word does not appear in any of the words resulting from the Viterbi algorithm (i.e., at any probability), then the user may add the word as a new word. System 100 updates dictionary D with the new word, and generates all the information associated with the new word, accordingly.

Certain users may exhibit a very unique writing style. If the information extracted from the text written by a particular user is dramatically different from the information contained in the HMMs generated during the training stage, then tablet interface 108 may prompt the user to repeat selected words or individual letter-shapes within a word.

According to another embodiment of the disclosed technique, system 100 further performs context analysis. System 100 adds information relating to the context of each word in the word-part dictionary (e.g., as a feature index).

In one example of context analysis, system 100 limits the word domain in accordance with the type of user. For example, system 100 limits the word domain in accordance with the profession of the user. For example, a journalist will likely use a different group of words than a computer scientist. Similarly, the terminology used by a physicist will differ slightly from the terminology used by an engineer. Examining the context of the word improves the overall recognition rate of system 100. Context analysis further limits the search domain of possible words, thereby speeding up the overall running time.

It will be appreciated by persons skilled in the art that the disclosed technique is not limited to what has been particularly shown and described hereinabove. Rather the scope of the disclosed technique is defined only by the claims, which follow.

The invention claimed is:

1. A method for online character recognition of Arabic text, the method comprising the procedures of:
   receiving handwritten Arabic text from a user in the form of handwriting strokes;
   sampling said handwriting strokes to acquire a sequence of two-dimensional point representations thereof, including associated temporal data;
   geometrically pre-processing and extracting features on said point representations;
   detecting delayed strokes and word-parts in said pre-processed point representations;
   projecting said delayed strokes onto the body of said word-parts;
   constructing feature vector representations for each said word-part, thereby generating an observation sequence;
   generating at least one word-part dictionary indexed in accordance with word features, wherein:
      said at least one word-part dictionary is a sub-dictionary of a dictionary that includes a set of valid words; and
      said at least one word-part dictionary contains words having a predetermined integer number of word-parts; and
   determining the word in part according to said at least one word-part dictionary with maximum probability given said observation sequence, resulting in a list of word probabilities;
   wherein each said word-part refers to an intra-connected portion of a word, which is bounded on each side by a minimal amount of space in the text.

2. The method according to claim 1, further including the procedure of providing at least one word having the highest resultant word probability, to be user selectable when more than one word is provided.

3. The method according to claim 1, further including the procedure of developing a respective probabilistic model for each letter-shape, based on a series of received predetermined words.

4. The method according to claim 3, wherein said procedure of developing a respective probabilistic model for each letter-shape includes the sub-procedures of:
   receiving online a series of predetermined handwritten Arabic words from at least one trainer;
   identifying letter-shapes in said received words;
   generating a plurality of Hidden Markov Models (HMMs), each of said HMMs representing a letter-shape; and
   establishing word-part networks that include word-parts of said at least one word-part dictionary, and associating said HMMs therewith.

5. The method according to claim 1, wherein said word with maximum probability is determined by performing a Viterbi algorithm.

6. The method according to claim 1, wherein said features are selected from the list consisting of:
   the number of word-parts in a word;
   the local-angle;
   the super-segment;
   the presence of loops;
   the position of a loop in a word-part;
   the presence of cusps;
   the presence of crossings;
   the number of closed curves;
   the number of indented sections;
   the number of dots;
   the location of a dot;
   the type of a delayed stroke;
   an indication whether a word-part begins with a curved shape; and
   the context of a word.

7. The method according to claim 1, wherein said procedure of geometrically pre-processing includes a type of processing selected from the list consisting of:
   reducing noise and imperfections in said point representations;
   eliminating redundant point samples;
   reducing the sampling rate;
   interpolation of said point representations;
   increasing the sampling rate; and
   re-sampling said point representations.

8. The method according to claim 1, wherein said procedure of detecting delayed strokes and word-parts includes:
generating boundary lines around a word-part;
searching for markings within the region encompassed by said boundary lines;
detecting markings within said region; and
determining if each of said markings is a delayed stroke associated with said word-part.

9. The method according to claim 1, wherein said procedure of projecting said delayed strokes onto the body of said word-parts includes, for each of said delayed strokes associated with a word-part,
creating a first vector extending from the first point of said delayed stroke point sequence to a point on the body of said word-part point sequence;
creating a second vector extending from the last point of said delayed stroke point sequence to a next point on the body of said word-part point sequence; and
creating a new point sequence that includes said delayed stroke point sequence, said word-part point sequence, said first vector point sequence, and said second vector point sequence.

10. The method according to claim 1, wherein said procedure of determining the word with maximum probability includes limiting the word domain in accordance with the type of user.

11. The method according to claim 4, further including the procedure of geometrically pre-processing and extracting features on said letter-shapes.

12. A system for online character recognition of Arabic text, the system comprising:
a user handwriting strokes interface, receiving handwritten Arabic text from a user in the form of handwriting strokes, and sampling said handwriting strokes to acquire a sequence of two-dimensional point representations thereof, including associated temporal data;
a character recognition processor, coupled with said user handwriting strokes interface, said character recognition processor geometrically pre-processing and extracting features on said point representations, detecting delayed strokes and word-parts in said pre-processed point representations, projecting said delayed strokes onto the body of said word-parts, constructing feature vector representations for each said word-part, thereby generating an observation sequence, generating at least one word-part dictionary of said word-parts indexed in accordance with word features, and determining the word with maximum probability given said observation sequence, resulting in a list of word probabilities; and
a storage unit, coupled with said user handwriting strokes interface and with said character recognition processor;
wherein
said at least one word-part dictionary is a sub-dictionary of a dictionary that includes a set of valid words;
said at least one word-part dictionary contains words having a predetermined integer number of word-parts; and
each said word-part refers to an intra-connected portion of a word, which is bounded on each side by a minimal amount of space in the text.

13. The system according to claim 12, wherein said system operates on a graphics tablet.

14. The system according to claim 12, wherein said system operates on a computer coupled with a graphics tablet.

15. The system according to claim 12, wherein said user writes said handwritten Arabic text with a digital writing instrument.

16. The system according to claim 13, wherein said graphics tablet includes an input screen selected from the list consisting of:
pressure sensitive;
touch sensitive; and
light sensitive.

17. The method according to claim 1, wherein said receiving handwritten Arabic text is via a writing instrument having a handwriting strokes interface, and wherein said sampling is via said handwriting strokes interface, and further comprising: performing a writing speed normalization by altering a sampling rate of said handwriting strokes interface.

18. The method according to claim 1, wherein said dictionary that includes a set of valid words is at least partially based on a predefined dictionary.

19. The system according to claim 12, wherein said user handwriting strokes interface is further operative to alter a sampling rate of said handwriting strokes interface to perform a writing speed normalization.

20. The system according to claim 12, wherein said character recognition processor is operative to establish word-part networks that include words of said at least one word-part dictionary, and to associate a Hidden Markov Model (HMM) therewith.

* * * * *